3,526,678
METAL COATING COMPOSITIONS AND
METAL COATED THEREWITH
Ronald H. Dahms, Springfield, and James A. Snelgrove,
Monson, Mass., assignors to Monsanto Company, St.
Louis, Mo., a corporation of Delaware
No Drawing. Filed Jan. 6, 1969, Ser. No. 789,391
Int. Cl. C08g 37/20; B44d 1/42
U.S. Cl. 260—844                                    4 Claims

ABSTRACT OF THE DISCLOSURE

Enamels suitable for use in coating metal to impart corrosion resistance and electrical insulation thereto. These enamel solutions employ a mixture of a polyvinyl acetal and a resole resin made by reacting formaldehyde with a phenol which has been previously substituted with a specific mixture of cyclopentadiene codimers. When coated onto metal and dried, the resulting coatings thermoset at surprisingly low temperatures and, when thermoset, display good electrical insulation characteristics and good physical strength properties.

BACKGROUND

In the art of coating metal surfaces, especially wire surfaces, with enamel, thermosettable enamels of formaldehyde condensation products (especially those with phenol) and polyvinyl acetals have been used. Coatings derived from such enamels characteristically display good electrical insulation properties and good mechanical strength properties. However, in order to thermoset such coatings, relatively rigorous thermosetting conditions must be employed (that is, relatively high temperatures and/or relatively long periods of time).

If lower temperatures and/or times could be employed to thermoset coatings derived from such enamels, such would be advantageous to the metal coating industry, because then the desirable properties obtained from using such enamels as coatings could be obtained with less energy consumption. Thus, in wire coating, existing wire coating towers could handle a larger quantity of a given type of wire in a given time since, at a given operating temperature sequence, such wire could be made to travel at a greater velocity through the tower and associated coating facilities.

There has now been discovered a new and improved liquid enamel metal coating composition which employs a particular substituted phenol-formaldehyde resin and a polyvinyl acetal. This enamel, when deposited onto metal surfaces and thermoset, not only produces a class of coatings having good electrical insulation properties, mechanical properties, and solvent resistance properties, but also having surprisingly capacity to thermoset at temperatures at least about 10 to 20% lower, or correspondingly, in times at least about 10 to 20% lower (depending on whether time or temperature, respectively, is held constant) than associated with prior art enamels employing polyvinyl acetal and phenol-formaldehyde resin. The reason for this reduction in thermosetting or curing time is not clear.

Importantly, the liquid enamel metal coating compositions of the present invention and the characteristics associated therewith are not substantially adversely affected by the addition thereto of certain other additives known to the prior art to be useful in improving certain physical properties of product thermoset coatings derived from phenolic resin enamel coating compositions (for example, such properties as cut-through resistance, solvent resistance, and the like). Thus, for example, apparently one can add thereto such classes of additives as organic isocyanates or melamine formaldehyde resins and obtain not only the expected improvements in thermoset coating physical and electrical properties, but also reductions in conditions previously used for thermosetting.

SUMMARY

The invention is directed to liquid compositions of certain substituted phenol-formaldehyde resole resins and polyvinyl acetal in a solvent medium. These compositions are especially adapted for use in the coating of metal surfaces. They characteristically thermoset at surprisingly low temperature-time conditons and, when thermoset, have good electrical insulation properties, and good mechanical strength properties. The coating compositions of this invention comprise:

(A) from about 5 to 75 weight percent of a dissolved substituted phenol-formaldehyde resole resin,
(B) from about 5 to 30 weight percent of a polyvinyl acetal, and
(C) the balance up to 100 weight percent in any given composition being an organic liquid which:
   (1) is substantially inert as respects reactivity towards such resole resin and such polyvinyl acetal,
   (2) has a dry point below about 275° C. at atmospheric pressure (preferably below about 200° C.),
   (3) is a dispersant for both such resole resin and such polyvinyl acetal.

Optionally, up to about 4 weight percent dissolved (in the organic liquid) water can be present, provided the actual quantity of water present in any given coating composition of the invention is such that the composition is substantially a single liquid phase, homogeneous system.

This invention is also directed to metal objects, or metal substrates, at least one surface of which is coated with a thermoset coating derived from a coating composition of this invention. One preferred metal substrate is copper, particularly in the form of electrically conductive wire; another preferred metal substrate is iron, especially in the form of steel sheeting formed into steel drums, and the like. The term "metal" as used herein refers to an electro-positive chemical element or mixture thereof characterized by ductility, malleability, luster, and conductivity of heat and electricity, and which can replace the hydrogen of an acid and form bases with the hydroxyl radical.

When the organic liquid portion of the coating compositions of this invention is substantially removed therefrom, as by evaporation or the like, there is produced a thermosettable composition which thermosets by the action of heat alone. The particular time and temperature conditons used for thermosetting vary, depending upon coating thicknesses, substrate, etc. In general, temperatures in the range of from about 175 to 450° C. applied for times of from about 5 seconds to 5 minutes are used, though times and temperatures above and below these values (inversely as respects one another, respectively) can be employed.

A composition is typically applied to a metal substrate surface to form a coating thereon, then dried and finally thermoset. Each thermoset coating individual layer thickness typically ranges from about 0.1 to 1 mil in thickness, although individual layer thicknesses of from about 0.2 to 0.6 mil are common. Thicker and thinner layers can, of course, be used. Commonly, a coating over a given metal substrate may be two or more layers thick, successively applied. Commonly individual layers are under about 0.5 mil in thickness. The composition of this invention can be applied over a base layer or layers, such base layer or layers being characteristically under about 1 mil in thickness, and preferably about 0.2 to 0.5 mil. An article of manufacture having a metallic surface coated with a composition of this invention characteristically comprises at least one thermoset layer derived from such composition having a thickness range as indicated above. Multiple layered coatings can range up to about 3 mils in thickness and can have, as is conventional in metal coating, especially wire coating, 4, 8, 12 or even more layers of material in a single coating. While a single coating is preferably composed substantially of at least two layers derived from the compositions of this invention, the coatings derived from compositions of this invention can be used in combination with the coatings derived from other compositions known to the prior art for use in metal coating. Examples of polymeric materials known for use as metal coatings include conventional polyvinyl acetal/cresol formaldehyde condensates, polyesters, epoxys, oleoresinous enamels, alkyds, polyester-imides, polyamide-imides, polyimides, acrylics, silicones, polyester-amide-imides, polyamides, mixtures thereof and the like. In general, the enamels of this invention when used on wire as insulative coatings are preferably employed as top coatings, particularly when base and intermediate coatings are derived from other different coating systems.

The substituted phenol-formaldehyde resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

It will be appreciated that the aldehyde to phenol ratios herein described have reference to the total amount of phenol present before a reaction, including the phenol which is substituted.

The substituted phenol mixture used to make such resin is itself prepared by initially reacting phenol under Friedel-Crafts conditions with a mixture of cyclopentadiene codimers which comprises (when in a form substantially free of other materials wherein the sum of all component compounds of any given such mixture equals substantially 100 weight percent):

(A) from about 50 to 99 weight percent of compounds each molecule of which has:
   (1) the dicyclopentadiene nucleus
   (2) from 10 through 13 carbon atoms
   (3) as nuclear substituents from 0 through 3 methyl groups, and
(B) from about 1 to 50 weight percent of compounds each molecule of which is a codimer of cyclopentadiene with at least one acyclic conjugated alkadiene having from 4 through 6 carbon atoms per molecule.

In a preferred such mixture, a minor amount of cyclic and/or acyclic conjugated alkadiene is present, typically less than about 15 weight percent (same basis) and having 5 or 6 carbon atoms per molecule. Thus, such a mixture can comprise:

(A') from about 70 to 90 weight percent of dicyclopentadiene,
(B') from about 10 to 30 weight percent of compounds each molecule of which is a codimer of cyclopentadiene with at least one acyclic conjugated alkadiene having from 4 through 6 carbon atoms per molecule, and
(C') from about 2 to 15 weight percent of compounds each molecule of which is a cyclic and/or an acyclic conjugated alkadiene having 5 or 6 carbon atoms per molecule.

In another preferred such mixture, both a minor amount (less than about 10 weight percent—same basis) for compounds containing the indene nucleus, and a minor amount (less than about 15 weight percent—same basis) of compounds containing the phenyl vinylidene structure are present. Thus, such a mixture can comprise:

(A") from about 1.5 to 10 weight percent of compounds each molecule of which has:
   (1) the indene nucleus
   (2) from 9 through 13 carbon atoms
   (3) as nuclear substituents from 0 through 4 methyl groups,
(B") from about 50 to 70 weight percent of compounds each molecule of which has:
   (1) the dicyclopentadiene nucleus
   (2) from about 10 through 13 carbon atoms
   (3) as nuclear substituents from 0 through 3 methyl groups,
(C") from about 4 to 10 weight percent of compounds each molecule of which is a codimer of cyclopentadiene with at least one acyclic conjugated alkadiene having from 4 through 6 carbon atoms per molecule, and
(D") from about 4 to 30 weight percent of compounds each molecule of which has:
   (1) a phenyl group substituted by a vinylidene group,
   (2) from 8 through 13 carbon atoms
   (3) as substituents from 0 through 3 groups selected from the class consisting of methyl and ethyl.

In still another preferred such mixture, there are controlled, minor amounts (from about 2 to 9 weight percent—same basis) of each of methylcyclopentadiene and codimers of cyclopentadiene with acyclic conjugated alkadienes relative to a major amount (from about 92 to 97 weight percent—same basis) of dicyclopentadiene. Thus, such a mixture can comprise:

(A''') from about 92 to 97 weight percent of dicyclopentadiene,
(B''') from about 1 to 5 weight percent of compounds each molecule of which is a codimer of cyclopentadiene with at least one acyclic conjugated alkadiene having from 4 through 6 carbon atoms per molecule, and
(C''') from about 1 to 4 weight percent of compounds each molecule of which is a codimer of cyclopentadiene with a methylcyclopentadiene, provided that the sum of (A''') and (C''') in any given such cyclopentadiene dimer mixture is always at least about 95 weight percent, and preferably about 95 weight percent, thereof (same basis).

Preferably, such a mixture contains at least about 3 weight percent (same basis) of (B''').

Examples of suitable such acyclic conjugated alkadienes (whether or not dimerized as specified above) include butadiene (a four carbon molecule used as specified above), piperylene, isoprene, 1,3-hexadiene, 1-methyl-1, 3-pentadiene, and the like.

At the time when such a mixture is reacted with phenol as indicated, there can be present as diluents inert (e.g., as respects reactivity towards component of such mixture and phenol under Friedel-Crafts reaction conditions) organic compounds, such as aromatic and aliphatic hydrocarbons. While there is no apparent upper limit on the amount of diluent which may be present, it is preferred that the amount of diluent present range from about 5 to 50 weight percent (same basis).

By the phrase "when in a form substantially free of other materials" reference is had to a mixture (e.g., of starting materials, of product, or the like, as the case may be) which is substantially free (e.g. on an analytical or theoretical basis) of substances (like inerts) as respects reactivity with phenol under Friedel-Crafts catalysis)

other than such mixture itself. For example, the afore-indicated starting mixture of diene codimers could have an inert hydrocarbon diluent admixed therewith, such as benzene, lower alkyl substituted benzenes, naphthalenes, and alkane hydrocarbons containing from 6 through 10 carbon atoms per molecule.

The term "cyclopentadiene" as used herein refers to the cyclic compound having the structure:

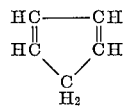

The term "dicyclopentadiene" as used herein refers to the cyclic compound having the structure:

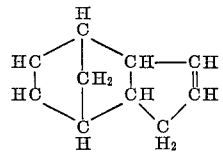

The term "vinylidene" as used herein has generic reference both to vinylidene radicals ($CH_2=C$), and vinyl radicals ($CH_2=CH—$ or $—CHCH—$); observe that in carbocyclic compound mixtures used in this invention having a phenyl group substituted by a vinylidene group, alpha-methyl substitution is included in this definition, as well as styrene, methyl styrene, and ethyl styrene.

All solids herein are conveniently measured using ASTM Test Procedure No. D–115–55.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, suitable such mixtures are shown in the following Tables I–III. In Table I is shown an example of such a mixture available commercially under the trade designation "Dicyclopentadiene Concentrate" from the Monsanto Company, St. Louis, Mo.; in Table II, one available commercially under the trade designation "Resin Former P" from Hess Oil and Chemical Co. of New York, N.Y. and in Table III, one available commercially under the trade designation "Dicyclopentadiene" from Union Carbide Company, New York, N.Y. and also one available commercially under the trade designation "Dicyclopentadiene" from Eastman Kodak Company, Rochester, N.Y.

TABLE I

| Component [1] | Total est. wt., percent [2] | Adjusted rel. approx. wt. [5] |
|---|---|---|
| (A) Dicyclopentadiene Compounds: | | |
| (1) Dicyclopentadiene | 72.1 | 77.1 |
| (2) Codimers of cyclopentadiene and methylcyclopentadiene | 0.4 | 0.4 |
| (B) Cyclopentadiene/Alkadiene Codimers (Codimers of cyclopentadiene and acyclic conjugated alkadienes containing from 4 through 6 carbon atoms per molecule) [3] | 18.6 | 19.8 |
| (C) Conjugated Alkadienes (Cyclic and acyclic conjugated alkadienes containing 5 and 6 carbon atoms per molecule) [4] | 2.2 | 2.3 |
| (D) Alkenes: (1) Cyclopentene | 0.4 | 0.4 |
| Total of (A), (B), (C), and (D) | 93.7 | 100.0 |
| (E) Inert Hydrocarbon Diluents (Total) | 6.3 | |
| (1) Benzene | 0.9 | |
| (2) Methylpentane, methylcyclopentane, and hexane | 5.4 | |

[1] Data in Table I derived from vapor-liquid-phase chromatography and mass spectrography.
[2] Based on total weight of diene dimer compounds and other components including diluents.
[3] These alkadienes are usually piperylene and isoprene; composition of such alkadienes is somewhat variable.
[4] These alkadienes are usually piperylene, isoprene and cyclopentadiene; composition of such alkadienes is somewhat variable.
[5] Diene codimer compound mixture when in a form substantially free of other materials wherein the sum of all component compounds in any given such mixture equals substantially 100 weight percent.

TABLE II

| Component | Total weight percent basis [1] | Weight percent diene codimer mixture components only [2] |
|---|---|---|
| Arylcycloalkenes | 1.7 | 1.9 |
| Indene | 1.7 | 1.9 |
| Dicyclopentadienes | 65.5 | 74.1 |
| Dicyclopentadiene | 48.9 | 55.3 |
| Methyldicyclopentadiene | 15.2 | 17.2 |
| Dimethyldicyclopentadiene | 1.4 | 1.6 |
| Cyclopentadiene/alkadiene codimers | 8.0 | 9.1 |
| Codimers of cyclopentadiene with acyclic conjugated alkadienes having from 4 through 6 carbon atoms per molecule: | | |
| Codimer with butadiene | 6.0 | 6.8 |
| Codimer with isoprene | 2.0 | 2.3 |
| Arylalkenes | 6.9 | 7.7 |
| Styrene | 5.6 | 6.3 |
| Alphamethylstyrene | 1.3 | 1.4 |
| Trimers incorporating cyclopentadiene, methylcyclopentadiene or conjugated alkadienes having from 4 through 6 carbon atoms per molecule [3] | 6.4 | 7.2 |
| Diene codimer mixture sub-total | 88.5 | 100.0 |
| Unidentified components | 2.1 | |
| Inert diluents | 9.4 | |
| Benzene | 0.1 | |
| Toluene | 3.7 | |
| Xylene and ethylbenzene | 5.1 | |
| Naphthalene | 0.5 | |

[1] These values derived using a combination of vapor liquid phase chromatography and mass spectrometry.
[2] When in a form substantially free of other materials wherein the sum of all component compounds of any given such mixture equals substantially 100 weight percent.
[3] Optionally, a diene codimer compound mixture for use in the present invention can contain from about 0 to 8 percent of such trimers.

TABLE III

| Component | Union Carbide, wt. percent [1] | Eastman Kodak, wt. percent [1] |
|---|---|---|
| Dicyclopentadienes | 93.2 | 95.6 |
| Methyldicyclopentadienes | 3.0 | 0.9 |
| Cyclopentadiene/acyclic conjugated diene codimers | 2.5 | 1.9 |
| Heavy ends [2] | 0.2 | 0.6 |
| Unidentified | 1.1 | 1.0 |

[1] These values derived using a combination of vapor liquid phase chromatography and mass spectrometry.
[2] Heavy ends here comprise primarily trimers of such components as cyclopentadiene, methylcyclopentadiene, and conjugated alkadienes containing from 4 through 6 carbon atoms per molecule. Typically, these heavy ends are reactive with phenol under Friedel-Crafts conditions as taught herein.

To react phenol with such an aforedescribed cyclopentadiene codimer mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the phenol and suitable Friedel-Crafts acid catalyst are mixed, brought to the proper temperature and the diene codimer compound mixture metered into the acidified (or catalyzed) phenol.

For purposes of this invention, the reaction of diene codimer compound mixture with phenol is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons having boiling points between about 70 and 140° C. The progress of the reaction can be monitored, if desired, by measuring the quantity remaining of unreacted diene codimer compound using, for example, vapor phase chromatography.

Friedel-Crafts catalysts which may be used in place of aluminum chloride, or together with aluminum chloride, include:

(A) other inorganic halides, such as gallium, titanium, antimony and zinc halides (including $ZnCl_2$);
(B) inorganic acids, such as sulphuric, phosphoric and the hydrogen halides (including H F);
(C) activated clays, silica gel alumina, and the like;
(D) $BF_3$ and $BF_3$ organic complexes including complexes of $BF_3$ with organic compounds, such as ethlike, is introduced into the reaction mixture. The pH of this reaction mixture using such basic catalyst is maintained about 7.0.

It will be appreciated that the formaldehyde to phenol ratios herein described have reference to the total amount of phenol present before a reaction, including the phenol which is substituted by the diene codimer compound mixture, as described above. Aqueous liquid phase preparation conditions are generally but not necessarily used.

To optimize electrical properties in such resole products it is preferred to use as a basic catalyst, when reacting such substituted phenols with formaldehyde, one which is organic (substantially non-ionic) in character, such as triethylamine, or the like. Suitable process variables for making such resole are summarized in Table V below:

TABLE V

| Process variable | Broad range | Preferred range |
| --- | --- | --- |
| Formaldehyde/phenol mol ratio | About 0.8 –2.0 | About 1.0–1.5. |
| Catalyst parts by weight (based on 100 parts by weight total phenol after neutralization of starting phenol. | About 0.1–10 | About 0.5–4. |
| pH | Above about 7.0 | About 7.5–8.5. |
| Temperature | About 60° C. to reflux | About 80° C. to reflux. |
| Reaction time | Under about 4 hours | About 20–120 min. | anol, butanol, glycol, phenol, cresol, anisole, ethyl ether, isopropyl ether, di-n-butyl ether, formic acid, acetic acid, and propionic acid, or with inorganic acids, such as phosphoric acid, sulfuric acid, and the like; and
(E) alkyl, aryl and aralkyl sulfonic acids, such as ethanesulfonic acid benzene sulfonic acid, benzene disulfonic acid, chlorobenzene sulfonic acid, 3,4-dichlorobenzene sulfonic acid, cresol sulfonic acids, phenol sulfonic acids, octylphenol sulfonic acid, -napthalene sulfonic acid, 1-napthol-4-sulfonic acid, and the like.

When $BF_3$, as such, is employed, it is conveniently fed to a reaction mixture in gaseous form. While any combination of diene codimer compound starting mixture, phenol and catalyst can be used, it is particularly convenient to react for each 100 parts by weight of phenol about 10 to 100 parts by weight of such diene codimer compound mixture (on a 100 weight percent basis in a form substantially free of other materials) in the presence of less than about 10 weight percent (based on the phenol) of acid catalyst.

The reaction mass is then heated to a temperature in the range of from about 25 to 200° C. The rate of this reaction is dependent, to some degree, on the temperature employed. In general, the reaction is rapid, and a complete reaction between phenol and diene codimer compound mixture is preferred. Suitable process variables are summarized in Table IV below.

The resole product produced by reacting the substituted phenol with aldehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole product having characteristics generally as described above. Such a resole can be regarded as being the reaction product of the above-described substituted phenol mixture and formaldehyde under aqueous base catalyzed conditions as described which product can be thermoset by heat alone without the use of a curing catalyst. In general, however, such resole product as made is a brown colored, unstable, multiphase aqueous emulsion whose viscosity depends, in any given instance, upon process and reactant variables, but which usually ranges from a syrupy liquid to a semi-solid state. A resole product derived from such aqueous phase as a brown colored material whose viscosity varies from a syrup to a solid. Such emulsion is preferably dehydrated and formed into a varnish for use in making the enamels of this invention.

Thus, when such emulsion is dehydrated under heat and reduced pressure to a water content generally under about 15 weight percent but over about 2 weight percent, there is produced a single-phased, clear, resole resin in the physical form usually of a high solids viscous dark

TABLE IV

| Process variable | Broad range | Preferred range |
| --- | --- | --- |
| Temperature, ° C | About 25 to 200° C | About 70 to 125° C. |
| Reaction time | Less than about 4 hours | About 10 to 30 minutes. |
| Catalyst (based on phenol) | Less than about 10 weight percent | About 0.1 to 1.0 percent. |
| Inert hydrocarbon | Up to about 50 weight percent | About 2 to 10 weight percent. |
| Content (based on total weight diene codimer compound mixture and diluent). | | |
| Total diene codimer compound mixture [1] (based on 100 parts by weight phenol) | About 10 to 100 parts by weight | About 20 to 70 parts by weight. |

[1] On a 100 weight percent basis in a form substantially free of other materials.

In general, to produce a resole phenol-formaldehyde resin for use in this invention from a substituted phenol product prepared as just described, such product is neutralized under aqueous liquid phase conditions as by the addition of base, and then from about 0.8 to 2.0 moles of formaldehyde per one mole of (starting) phenol is mixed with the substituted phenol product ( now itself a starting material). Also a basic catalyst material such as hexamethylenetetramine, ammonium hydroxide, triethylamine, sodium hydroxide, mixtures thereof, and the fluid. In any given instance, its total solids content, (residual) water content, and viscosity depend upon the amount of substituted phenol aldehyde product present, the mol ratio of aldehyde to substituted phenol, type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin"

which consists substantially of pure resin. Usually the water content after such a dehydration is not less than about 0.5 weight percent of the product resin, in general.

Suitable resole dehydration conditions typically involve the use of a vacuum ranging from about 25 to 28 inches Hg and temperature ranging from about 40 to 90° C. Higher and lower temperatures and pressures can be employed, as those skilled in the art appreciate.

To prepare a varnish from a dehydrated resole product as described above, such resole is then conveniently dissolved in an organic liquid medium having properties generally as defined above. It is not necessary, and it is preferred not, to prepare the resole resin in the form of a solid before dissolution thereof in organic solvent. In general, the water content of the partially dehydrated resole material is controlled so that the water content of the solution of resole resin in such organic liquid (the varnish) is below about 4 weight percent (based on total weight).

The organic liquid as indicated above is a dispersant for the resin. By the term "dispersant" is embraced both solvation and suspension. The term "dissolved" as used herein has reference not only to dissolution but also to suspension. It will be appreciated that in a suspension of such resin that the particles suspended are under about 1 micron in average maximum cross-sectional dimension and preferably are under about 200 millimicrons in such dimension.

While the organic liquid used has properties as indicated above, it will be appreciated that such liquid can comprise mixtures of different organic liquids. Preferred liquids are cresols and lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonane, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken when using this procedure to use an organic liquid system in which the phenolic resole resins are completely soluble as well as any water present. Adding, for example, a ketone or an ether solvent like butyl cellulose generally improves the water tolerance (ability to dissolve water) of a solvent system.

The varnishes thus made for use in this invention typically comprise:

(A) from about 20 to 75 weight percent of the above described substituted phenol-formaldehyde resole resin,
(B) from about 0.5 to 4 weight percent of dissolved water, and
(C) the balance up to 100 weight percent of any given varnish being an organic liquid which:
　　(1) is substantially inert (as respects such resin mixture),
　　(2) boils (evaporates) below about 275° C. at atmospheric pressures,
　　(3) is a dispersant for such resin and for such water (if present).

These varnishes are characteristically dark colored, one-phase, clear liquid solutions having a viscosity ranging from about 5 to 5000 centipoises, the exact viscosity of a given varnish depending upon chemical process and product variables used in manufacture. For impregnating applications, viscosities of from about 50 to 500 centipoises are preferred.

The total solids content of a given varnish product can be as high as about 85 weight percent or even higher and as low as about 20 weight percent or even lower, but preferred solids contents usually fall in the range of from about 25 to 65 weight percent.

The polyvinyl acetals useful in this invention are obtained by reacting polyvinyl alcohols or a partially hydrolyzed polyvinyl ester with an aldehyde, such as a lower alkanal like formaldehyde (preferred), acetaldehyde, propionaldehyde, butyraldehyde, mixtures thereof, or the like; or an aromatic aldehyde such as benzaldehyde, or the like. Polyvinyl acetals used in this invention preferably contain hydroxyl groups and preferably contain ester groups, the exact percentage of each in any given polyvinyl acetal depending upon the extent of the hydrolysis and the acetalization reactions. The preferred polyvinyl acetals are polyvinyl formal resins. Preferred polyvinyl acetals for use in this invention contain, on a weight basis, from about 0.1 to 16 weight percent ester groups calculated as polyvinyl ester, 5 to 25 weight percent hydroxyl groups calculated as polyvinyl alcohol, the balance up to 100 weight percent of any given polyvinyl acetal being substantially aldehyde acetal calculated as the corresponding polyvinyl acetal. These materials preferably have a weight average molecular weight from about 5,000 to 250,000 and more preferably from about 10,000 to 50,000. In preferred polyvinyl acetals used in this invention, the ester groups are substantially all acetate groups, but it will be appreciated that other suitable polyvinyl acetals can contain other ester groups such as formate groups, propionate groups, and the like. Methods for the manufacture of polyvinyl acetals are well known to those of ordinary skill in the art and so are not detailed herein.

The polyvinyl acetals for use in this invention are conveniently dissolved in an organic liquid. The organic liquid is a dispersant for the polyvinyl acetal. By the term "dispersant" (as indicated above) is embraced both solvation and suspension and the term "dissolved" as used herein has reference not only to dissolution but also to suspension. It will be appreciated that in a suspension of such polyvinyl acetal that the particles suspended are under about 1 micron in average maximum crosssectional dimension and preferably are under about 200 millimicrons in such dimension. The organic liquid used for the polyvinyl acetal is preferably a relatively high boiling (e.g., from about 125 to 275° C.). Typical liquids include mixtures of cresylic acid and so-called high flash napthas.

To speed up the dissolution of the polyvinyl acetal in the liquid, heat may be employed. Typically, a solution of polyvinyl acetal in such an organic medium contains a total solids content ranging from about 5 to 25 weight percent of the polyvinyl acetal. The total solids content of a polyvinyl acetal solution can be as high as about 35 weight percent or even higher and as low as about 5 weight percent or even lower, but preferred such solids contents range from about 10 to 25.

To prepare a liquid enamel coating composition of the invention, it is generally convenient to employ a separately prepared substituted phenolformaldehyde resin varnish and a separately prepared solution of a polyvinyl acetal in an organic solvent system. The organic liquid used may be a complex mixture of different chemical entities. Thus the organic liquid portion of an enamel composition of this invention can contain liquids boiling over a relatively wide range. It is preferred that a given enamel have a dry point below about 275° C. (e.g. all liquid vaporizes at normal atmospheric pressures below this temperature). When a product enamel composition is to be used in wire coating, the art prefers to employ relatively high boiling organic liquids (as described above). The two respective solutions are often simply mixed together in the relative respective amounts needed to produce a product composition having the above indicated contents of respective components. It will be appreciated that any convenient preparation procedure can be employed.

For example, when preparing such a composition for use in wire coating, it is convenient to dissolve a substituted phenol-formaldehyde resin varnish and a polyvinyl formal, each in an organic liquid mixture comprising typically cresylic acid, and one or more other aromatic hydrocarbons. Examples of suitable hydrocarbons include petroleum derived mixtures like Solvesso 100 (a product of the Humble Oil Co.) xylol, mixtures thereof, and the like. It is usually convenient to employ from about 30 to 70 parts by weight of the cresylic acid, and, correspondingly from about 30 to 70 parts by weight of the naphthalenic hydrocarbon in a total given such organic solvent liquid mixture. As those skilled in the art will appreciate, cresylic acid is typically a mixture of different cresols and xylenols. Optionally, one can employ phenol itself as an additive to this mixture of cresylic acid and naphthalenic hydrocarbons. Thus, in general, one can use as much as 50 weight percent, or even more, of phenol in a total given such organic solvent liquid mixture. A preferred such mixture boils in the range of from about 125 to 200° C. The exact choice of a given solvent medium is determined by the boiling point desired for the resulting solution, the cost of the solvents available, viscosity and other coating characteristics desired in a given product solution. In general, one prefers to have in a product solution as low a viscosity as practical for a given total solids content because a low viscosity allows the use of a higher solids content, which in turn tends to desirably reduce the overall cost per pound of solids coating deposited on a metal substrate due to reduced solvent losses.

An enamel coating composition of this invention typically has a viscosity less than about 50,000 centipoises, with preferred viscosities ranging from about 100 to 10,000 centipoises.

Any metal surface can be coated with a liquid coating composition of this invention as indicated above, but preferred substrate metals are copper in the form of wire filaments ranging in average maximum cross-sectional dimension (typically but not necessarily a diameter) from about 0.5 to 500 mils or ever greater and steel sheeting as incorporated into drums and typically ranging in thickness from about 20 to 32 gauge.

Any convenient metal coating procedure can be employed to coat such a metallic substrate with a liquid enamel coating composition of this invention, including spraying, dipping, painting and the like. After application to a substrate surface, the coating is usually dried at an elevated temperature (e.g. at temperatures of from about 80 to 500° C. depending on the organic liquid used in the enamel) for a time sufficient to crosslink (cure or thermoset) the resulting coating as indicated above. Multiple coatings are especially useful and common, especially in wire coating. It is preferred to thermoset individual coatings after application and before applying a subsequent overcoating. When coating a wire with an enamel composition of this invention, for example, it is usually convenient to employ a so-called wire coating tower (which can be vertically, horizontally or otherwise oriented) in which the tower has a top roller (or a plurality of individual sleaves) and a bottom roller rotatably mounted at opposite end regions of the tower. Each roller optionally has a plurality of peripheral grooves therein to accommodate a plurality of individual strands of wire and effect a separation thereof. The central portion of the tower contains an enclosed vertical thermally insulated duct. This duct has at least one controllable heated zone. A first strand of a given wire from a spool is first coated and then passed through the heated zone of the tower. After such passage, the wire is recoated and repassed through the heated zone. After each coating operation and before entry into the heated zone, the freshly coated wire is optionally passed through a wiper die to limit or control coating thickness. Typically, and preferably, the diameter of the wiper die is slightly larger than that of the wire before coating. For example, the diameter of a die can be from about 0.001 to about 0.020 inch greater than the diameter of the uncoated wire where the wire is from about 0.005 to 0.080 inch in diameter. As is well known in the art, fine copper wire is often coated without using wiper dies.

After a coating operation, a coated wire is wound up, conveniently, on a spool. A wire is thus continuously and rapidly coated, using such a tower, with a plurality of successively applied enamel coatings. Sometimes a first coating or coatings on a wire is used as a primer coat and this first coating can be different from later coatings, and sometimes one or more (e.g. two) top coat layers on a wire is (are) used as a finish coat and such last coating(s) can be different from earlier or intermediate coatings. Preferred top coatings are thermoset compositions of the invention. In general, conventional wire coating towers and associated methods of use can be employed in the practice of coating wire with compositions of this invention. At least one and preferably all coating layers are derived from compositions of the invention.

Those skilled in the art will appreciate that the compositions of this invention can additionally contain conventional additives, adjuvants, and the like known to the art of thermosetting enamels. For example, one can add to a liquid composition of this invention such materials as melamine-formaldehyde condensates (typically from about 1 to 10 weight percent based on the polyvinyl acetal), and polyurethanes (typically from about 5 to 100 weight percent based on polyvinyl acetal). A preferred class of polyurethanes are represented by the following general formula:

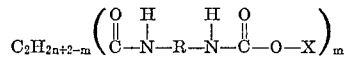

where R represents a member of the class consisting of phenylene, methyl phenylene, naphthylene and methyl naphthylene groups, X represents a member of the class consisting of phenyl and alkyl phenyl groups, said alkyl group containing from 1 through 6 carbon atoms, $m$ is an integer greater than 1 but not greater than $n$, and $n$ is an integer from 2 through 10. These particular polyurethanes are aliphatic, aromatic polyesters of aromatic dicarbamic acids.

When these formulations are used for drum liners, one can conventionally compound with a liquid composition of this invention up to about 30 weight percent of a pigment.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of substituted phenol-formaldehyde resole resin varnishes suitable for use in making enamels of this invention are prepared as shown below. In each instance, the substituted phenol-formaldehyde resole resin produced as described, and employed in each varnish described, has a formaldehyde to phenol ratio of from about 0.9 to 1.5. Each is produced by reacting in the presence of an organic basic catalyst under liquid aqueous phase conditions a substituted phenol mixture with formaldehyde. Each is substantially water insoluble, but has a methanol solubility such that a 60 weight percent solution thereof can be prepared in methanol. Each such methanol solution characteristically has a viscosity in the range from about 50 to 500 centipoises. Each resin has a free formaldehyde content which is less than about 5 weight percent.

Examples of substituted phenols made with one preferred starting mixture used in this invention and resoles made therefrom are given below.

Example A′

To a stirred reaction vessel 100 parts of phenol and 0.5 part concentrated sulfuric acid are charged and the resulting mixture is heated to 125° C. Then 25 parts of a diene codimer compound mixture available commercially under the trade designation "Dicyclopentadiene Concentrate" from Monsanto Company and having a composition as described above in Table I are added to this phenol mixture over a thirty minute period, keeping the temperature between 125 and 135° C. After the addition, the mixture temperature is held at 125 to 135° C. for fifteen minutes. The product is a substituted phenol mixture.

Examples B' to G'

Using the procedure and raw materials described in Example A', additional substituted phenol mixtures are prepared, as shown in Table VI below:

TABLE VI

| Ex. | Friedel-Crafts catalyst, parts per 100 phenol | Diene codimer mixture, parts per 100 phenol | Reaction temp., °C. | Post reaction holding period min. |
|---|---|---|---|---|
| B'  | H₂SO₄-0.5 | 20 | 125 | 15 |
| C'  | H₂SO₄-0.5 | 40 | 125 | 30 |
| D'  | H₂SO₄-0.5 | 55 | 125 | 30 |
| E'  | H₂SO₄-1.0 | 65 | 150 | 30 |
| F'  | AlCl₃-1.0 | 35 | 125 | 30 |
| G'  | BF₃-etherate-0.5 | 70 | 150 | 60 |

Example 1'

To the substituted phenol mixture made in Example A' is added (per 100 parts of phenol) 2 parts triethylamine, 2 parts hexamethylenetetramine and 83 parts of 50 percent formalin. This mixture is heated to a 100° C. reflux for 55 minutes, then cooled to 50° C. to produce a resole resin which is then dehydrated to 60° C. and 26 inches Hg. When this temperature is reached, 80 parts methanol are added and the solution cooled. The product varnish is clear and thermally cures to give a clear film on a heated steel surface. The varnish has 60.3% solids and an Ostwald viscosity of 98 centipoises.

Example 2'

To the substituted phenol mixture made in Example D' is added (per 100 parts of phenol) 2 parts of triethylamine, 3 parts of hexamethylenetetramine and 60 parts of 50% formalin. The mixture is heated to a 100° C. reflux for 50 minutes, then cooled to 50° C. to produce a resole resin which is then dehydrated to 60° C. and 27 inches Hg. When this temperature is reached, 80 parts methanol are added. A clear varnish is obtained which thermally cures to give a clear film on a heated steel surface.

Examples 3' to 6'

Examples of other varnishes of this invention are summarized in Table VII. Preparation procedure for each is as given in Example 1'. In each instance, a clear varnish is obtained which thermally cures to give a clear film.

TABLE VII

| Example No. | Substituted phenol example | Resole preparation method, Ex. No. |
|---|---|---|
| 3' | B' | 1' |
| 4' | C' | 2' |
| 5' | E' | 2' |
| 6' | F' | 1' |
| 7' | G' | 2' |

Example 7'

To a stirred reaction vessel 100 parts of phenol and 0.5 part concentrated sulfuric acid are charged and the resulting mixture is heated to about 125° C. Then 30 parts of a diene codimer mixture are added to the phenol mixture over a thirty minute period, keeping the temperature between 125 and 135° C. This diene codimer compound mixture comprises, when in a form substantially free of other materials wherein the sum of all component compounds of any given such mixture equals substantially 100 weight percent, about 70 weight percent dicyclopentadiene, about 28 weight percent of codimers of cyclopentadiene with butadiene and isoprene (50/50) and about 2 weight percent of 50/50 1-pentene and 1-hexene mix. This diene codimer mixture additionally contains about 10 weight percent toluene as an inert diluent. After the addition, the product mixture is held at 125 to 135° C. for about fifteen minutes.

To this substituted phenol product mixture is then added (per 100 parts of phenol) 2 parts triethylamine, 2 parts by weight hexamethylenetetramine and 83 parts by weight of 50 percent formalin. This mixture is heated to a 100° C. reflux for about 55 minutes, then cooled to 50° C. to produce a resole resin which is then dehydrated under vacuum to 60° C. and 26 inches Hg. When this temperature is reached, 80 parts methanol are added and the solution cooled. The varnish product so produced is clear and thermally cures to give a clear film on a heated steel surface.

Example 8'

The procedure of Example 7' is repeated except that here the diene codimer compound mixture comprises, when in a form substantially free of other materials wherein the sum of all component compounds of any given such mixture equals substantially 100 weight percent, about 90 weight percent of dicyclopentadiene, about 8 weight percent of codimers of cyclopentadiene with butadiene and isoprene (50/50), and about 2 weight percent of 50/50 1-pentene and 1-hexene mix.

This diene codimer mixture additionally contains about 10 weight percent toluene as an inert diluent. The varnish product so produced is clear and thermally cures to give a clear film on a heated steel surface.

Example 9'

The procedure of Example 7' is repeated except that here the diene codimer mixture comprises, when in a form substantially free of other materials wherein the sum of all component compounds of any given such mixture equals substantially 100 weight percent, about 80 weight percent dicyclopentadiene, about 5 weight percent of codimers of cyclopentadiene with butadiene and isoprene (50/50), and about 15 weight percent of 50/50 1-pentene and 1-hexene mix. This diene codimer mixture additionally contains about 10 weight percent toluene as an inert diluent. The varnish product so produced is clear and thermally cures to give a clear film on a heated steel surface.

Examples of suitable substituted phenol mixtures made with another preferred starting mixture used in this invention and resoles made therefrom are given below:

Example A''

To a stirred reaction vessel 100 parts of phenol and 0.5 part concentrated sulfuric acid are charged and the resulting mixture is heated to 125° C. Then 30 parts of a diene codimer mixture available commercially under the trade designation "Resin Former P" from the Hess Oil and Chemical Co. and having a composition as described above in Table II are added to the phenol mixture over a thirty minute period, keeping the temperature between 125 and 135° C. After the addition, the mixture is held at 125 to 135° C. for fifteen minutes. The product is a substituted phenol mixture.

Examples B''–I''

Using the procedure and raw materials described in Example A'', additional substituted phenol mixtures are prepared, as shown on Table VIII below.

TABLE VIII

| Example | Friedel-Crafts catalyst, parts per 100 phenol | Diene codimer mixture, parts per 100 phenol | Reaction temp., °C. | Post reaction holding temp., °C. |
|---|---|---|---|---|
| B″ | $H_2SO_4$-0.5 | 20 | 125 | 20 |
| C″ | $H_2SO_4$-0.5 | 40 | 125 | 30 |
| D″ | $H_2SO_4$-0.5 | 50 | 125 | 60 |
| E″ | $H_2SO_4$-1.0 | 60 | 150 | 60 |
| F″ | $AlCl_3$-1.0 | 60 | 150 | 60 |
| G″ | $AlCl_3$-1.0 | 30 | 125 | 15 |
| H″ | $BF_3$-Etherate-0.5 | 70 | 150 | 60 |

Examples of phenolic resole resin varnishes of this invention are illustrated below.

Example 1″

To the substituted phenol mixture made in Example A″ is added (per 100 parts of phenol) 2 parts triethylamine, 2 parts hexamethylenetetramine and 83 parts of 50% formalin. This mixture is heated to a 100° C. reflux for 55 minutes, then cooled to 50° C. to produce a resole resin which is then dehydrated to 60° C. and 26 inches Hg. When this temperature is reached, 80 parts methanol are added and the solution cooled. The varnish product so produced is clear and thermally cures to give a clear film on a heated steel surface.

Example 2″

To the substituted phenol mixture made in Example D″ is added (per 100 parts of phenol) 2 parts of triethylamine, 3 parts of hexamethylenetetramine and 60 parts of 50% formalin. The mixture is heated to a 100° C. reflux for 50 minutes, then cooled to 50° C. to produce a resole resin which is then dehydrated to 60° C. and 27 inches Hg. When this temperature is reached, 70 parts methanol and 10 parts methyl ethyl ketone are added. A clear varnish product is thus obtained which thermally cures to give a clear film on a heated steel surface.

Examples 3″–7″

Examples of other varnishes of this invention are summarized in Table IX. Preparation procedure for each is as given in Example 1′. In each instance, a clear varnish is otbained which thermally cures to give a clear film.

TABLE IX

| Example No. | Substituted phenol example | Resole preparation method, Ex. No. |
|---|---|---|
| 3″ | B″ | 1 |
| 4″ | C″ | 2 |
| 5″ | E″ | 2 |
| 6″ | G″ | 2 |
| 7″ | H″ | 1 |

Example 8″

To a stirred reaction vessel 100 parts of phenol and 0.5 part concentrated sulfuric acid are charged and the resulting mixture is heated to about 125° C. Then 30 parts of a diene codimer mixture are added to the phenol mixture over a thirty-minute period, keeping the temperature between 125 and 135° C. This diene codimer mixture comprises, when in a form substantially free of other materials wherein the sum of all component compounds of any given such mixture equals substantially 100 weight percent, about 5 percent by weight of indene, about 70 percent by weight of dicyclopentadiene, about 5 percent by weight of codimers of cyclopentadiene with butadiene and isoprene (50/50) and about 20 percent by weight styrene. This diene codimer mixture additionally contains about 10 weight percent toluene as an inert diluent. After the addition, the product mixture is held at 125 to 135° C. for about fifteen minutes.

To this substituted phenol product mixture is then added (per 100 parts of phenol) 2 parts triethylamine, 2 parts by weight hexamethylenetetramine and 83 parts by weight of 50 percent formalin. This mixture is heated to a 100° C. reflux for about 55 minutes, then cooled to 50° C. to produce a resole resin which is then dehydrated under vacuum to 60° C. and 26 inches Hg. When this temperature is reached, 80 parts methanol are added and the solution cooled. The varnish product so produced is clear and thermally cures to give a clear film on a heated steel surface.

Example 9″

The procedure of Example 8″ is repeated except that here the diene codimer mixture comprises, when in a form substantially free of other materials wherein the sum of all component compounds of any given such mixture equals substantially 100 weight percent, about 10 percent by weight of indene, about 50 percent by weight of dicyclopentadiene, about 10 percent by weight of codimers of cyclopentadiene with butadiene and isoprene (50/50) and about 30 percent by weight styrene. This diene codimer mixture additionally contains about 10 weight percent toluene as an inert diluent. The varnish product so produced is clear and thermally cures to give a clear film on a heated steel surface.

Example 10″

The procedure of Example 8″ is repeated except that here the diene codimer mixture comprises, when in a form substantially free of other materials wherein the sum of all component compounds of any given such mixture equals substantially 100 weight percent, about 5 percent by weight of codimers of cyclopentadiene with butadiene and isoprene, (50/50), and about 6 percent by weight of styrene. This diene codimer mixture additionally contains about 10 weight percent toluene as an inert diluent. The varnish product so produced is clear and thermally cures to give a clear film on a heated steel surface.

Examples of suitable substituted phenol mixtures made with another preferred starting mixture used in this invention and resoles made therefrom are given below:

Example A‴

To a stirred reaction vessel 100 parts of phenol and 0.5 part concentrated sulfuric acid are charged and the resulting mixture is heated to 125° C. Then 25 parts of a cyclopentadiene codimer compound mixture available commercially from Eastman Chemical Company under the trade designation "Dicyclopentadiene" and having a composition as described in Table III above are added to the phenol mixture over a thirty minute period, keeping the temperature between 125 and 135° C. After the addition, the mixture temperature is held at 125 to 135° C. for fifteen minutes. The product is a substituted phenol mixture.

Examples B‴–J‴

Using the procedure and raw materials described in Example A‴ additional substituted phenol mixtures are prepared as shown in Table X below:

TABLE X

| Example | Friedel-Crafts catalyst, parts per 100 phenol | Cyclopentadiene compound mixture, parts per 100 phenol | Reaction temp. | Post reaction holding period, min. |
|---|---|---|---|---|
| B‴ | $H_2SO_4$-0.5 | 35 | 125 | 15 |
| C‴ | $H_2SO_4$-0.5 | 45 | 125 | 15 |
| D‴ | $H_2SO_4$-0.5 | 55 | 125 | 35 |
| E‴ | $H_2SO_4$-0.5 | 65 | 150 | 180 |
| F‴ | $H_2SO_4$-0.5 | 75 | 150 | 180 |
| G‴ | $H_2SO_4$-2.0 | 100 | 150–160 | 240 |
| H‴ | $H_2SO_4$-1.0 | 20 | 75 | 180 |
| I‴ | $AlCl_3$-2.0 | 45 | 150 | 30 |
| J‴ | $BF_3$-etherate-0.5 | 55 | 75 | 240 |

Examples of phenolic resole resin varnishes of this invention are illustrated below. The substituted phenol-formaldehyde resole resin produced as described and employed in each varnish product has a formaldehyde to phenol ratio of from about 0.9 to 1.5. Each is produced by reacting in the presence of an organic basic catalyst under liquid aqueous phase conditions a substituted phenol mixture wiht formaldehyde. Each is substantially water insoluble, but has a methanol solubility such that a 60 weight percent solution thereof can be prepared in methanol. Each such methanol solution characteristically has a viscosity in the range from about 50 to 500 centipoises. Each resin has a free formaldehyde content which is less than about 5 weight percent. Each of the product varnishes is suitable for use in impregnating cellulosic substrates.

Example 1'''

To the substituted phenol mixture made in Example A''' is added (per 100 parts of phenol) 2 parts triethylamine, 2 parts hexamethylenetetramine and 83 parts of 50 percent formalin. This mixture is heated to a 100° C. reflux for one hour, then cooled to 50° C. to produce a resole resin which is then dehydrated to 70° C. and 26 inches Hg. When this temperature is reached, 80 parts methanol are added and the solution cooled. The product varnish is clear and thermally cures to give a clear film on a heated steel surface. The varnish has 61 percent solids and an Ostwald Viscosity of 123 centipoises.

Example 2'''

To the substituted phenol mixture made in Example J''' is added (per 100 parts of phenol) 2 parts of triethylamine, 3 parts of hexamethylenetetramine and 60 parts of 50 percent formalin. The mixture is heated to a 100° C. reflux for 50 minutes, then cooled to 50° C. to produce a resole resin which is then dehydrated to 60° C. and 27 inches Hg. When this temperature is reached, 70 parts methanol and 10 parts methyl ethyl ketone are added. A clear varnish is obtained which thermally cures to give a clear film on a heated steel surface.

Examples 3'''–10'''

Examples of other varnishes of this invention are summarized in Table XI. Preparative procedures used are as shown in this table. In each instance, a clear varnish is obtained which thermally cures to give a clear film.

TABLE XI

| Ex. No. | Substituted phenol Example | Resole preparation method ex. No. | Methylolation catalyst, parts per 100 phenol |
| --- | --- | --- | --- |
| 3''' | B''' | 1''' | As in Ex. 1'''. |
| 4''' | C''' | 2''' | As in Ex. 2'''. |
| 5''' | D''' | 2''' | Do. |
| 6''' | E''' | 2''' | Do. |
| 7''' | F''' | 2''' | Do. |
| 8''' | G''' | 2''' | As in Ex. 2''', plus 2 parts triethylamine. |
| 9''' | H''' | 1''' | As in Ex. 1''', plus 1 part triethylamine. |
| 10''' | I''' | 2''' | As in Ex. 1''', plus 1 part triethylamine. |

Example 11'''

To a stirred reaction vessel 100 parts of phenol and 0.5 part concentrated sulfuric acid are charged and the resulting mixture is heated to about 125° C. Then 30 parts of a diene codimer mixture are added to the phenol mixture over a thirty minute period, keeping the temperature between 125 and 135° C. This diene codimer mixture is a cyclopentadiene codimer compound mixture available commercially from Union Carbide Company under the trade designation "Dicyclopentadiene" and having a composition as described in Table XI above. After the addition, the product mixture is held at 125 to 135° C. for about fifteen minutes.

To this substituted phenol product mixture is then added (per 100 parts of phenol) 2 parts triethylamine, 2 parts by weight hexamethylenetetramine and 83 parts by weight of 50 percent formalin. This mixture is heated to a 100° C. reflux for about 55 minutes, then cooled to 50° C. to produce a resole resin which is then dehydrated under vacuum to 60° C. and 26 inches Hg. When this temperature is reached, 80 parts methanol are added and the solution cooled. The varnish product so produced is clear and thermally cures to give a clear film on a heated steel surface.

Example 12'''

The procedure of Example 11''' is repeated except that here the diene codimer mixture comprises, when in a form substantially free of other materials wherein the sum of all component compounds of any given such mixture equals substantially 100 weight percent, about 91 weight percent dicyclopentadiene, about 5 weight percent of codimers of cyclopentadiene with butadiene and isoprene (50/50), and about 4 weight percent of a codimer of cyclopentadiene with a methyl cyclopentadiene.

This diene codimer mixture additionally contains about 10 weight percent toluene as an inert diluent. The varnish product so produced is clear and thermally cures to give a clear film on a heated steel surface.

Examples of enamels of this invention are as follows:

Examples 1–31

The resole varnish compositions of Examples 1' through 9', 1'' through 10'', and 1''' through 12''' (above) are each formulated with a polyvinyl acetal solution to prepare liquid enamel compositions. The preparation procedure in each instance involves adding with gentle stirring for mixing the indicated phenolic resole resin solution to the indicated solution of polyvinyl acetal.

The polyvinyl acetal solutions used in each instance involve a specified polyvinyl acetal dissolved in a mixture of cresylic acid and high flash naphtha. The cresylic acid used is available commercially under the trade designation "Cresylic Acid R–7B" from Allied Chemical Corporation. This material has a specific gravity of 1.022 to 1.032 at 25° C. compared to water at 15.5° C. and contains at least 29 weight percent of meta cresol, and not more than 0.5 weight percent water. It has a distillation range at normal atmospheric pressure of 200° C. minimum to 227° C. maximum.

The high flash napta used is available commercially under the trade designation "Solvesso 100" from Esso Corporation. This material reportedly contains about 1.13% $C_8$ aromatics, about 90.32% $C_9$ aromatics (especially 1-methyl, 3-ethyl benzene and 1,2,4-trimethylbenzene), about 1.80% indane and about 3% of $C_{10}$, $C_{11}$, and other aromatics, and it reportedly has a dry point of about 344° F. The concentration of polyvinyl acetal on a weight percent basis in each solvent is as described in Table XII below. For convenience, the characteristics of each particular type of polyvinyl acetal used is listed in Table XIII below.

Each product liquid enamel composition so made is as indicated in Table XII. Each is storage stable at room temperature for periods of time in excess of one week, and is dark brown in color. Each such product enamel composition displays typically a hazy appearance, when a sample thereof in a transparent container is held up to daylight. The organic liquid portion of each enamel has a dry point below about 275° C.

TABLE XII.—ENAMEL COMPOSITIONS

| Ex. No. | Polyvinyl acetal Wt. percent in total composition | Type | Substituted phenol-formaldehyde resin, wt. percent in total composition Wt. percent | Percent solids | Type Ex. No. | Balance [1] |
|---|---|---|---|---|---|---|
| 1 | 11.5 | 1 | 9.6 | 60 | 1' | 78.9 |
| 2 | 13.0 | 1 | 4.9 | 63 | 2' | 82.1 |
| 3 | 20.0 | 3 | 16.7 | 60 | 3' | 63.3 |
| 4 | 15.0 | 2 | 8.3 | 61 | 4' | 76.7 |
| 5 | 5.0 | 1 | 15.4 | 65 | 5' | 79.6 |
| 6 | 25.0 | 3 | 20.0 | 60 | 6' | 55.0 |
| 7 | 5.0 | 3 | 69.2 | 65 | 7' | 25.8 |
| 8 | 10.3 | 4 | 7.8 | 65 | 8' | 81.9 |
| 9 | 10.7 | 2 | 16.1 | 65 | 9' | 73.2 |
| 10 | 11.5 | 1 | 11.5 | 60 | 1'' | 77.0 |
| 11 | 10.7 | 5 | 8.0 | 63 | 2'' | 81.3 |
| 12 | 10.3 | 2 | 10.3 | 60 | 3'' | 79.4 |
| 13 | 13.0 | 3 | 6.0 | 61 | 4'' | 81.0 |
| 14 | 11.5 | 1 | 9.1 | 63 | 5'' | 79.4 |
| 15 | 13.0 | 1 | 5.2 | 60 | 6'' | 81.8 |
| 16 | 20.0 | 3 | 15.4 | 65 | 7'' | 64.6 |
| 17 | 15.0 | 2 | 8.3 | 61 | 8'' | 76.7 |
| 18 | 5.0 | 1 | 16.4 | 61 | 9'' | 78.6 |
| 19 | 25.0 | 3 | 20.0 | 60 | 10'' | 55.0 |
| 20 | 5.0 | 3 | 74.0 | 61 | 1''' | 21.0 |
| 21 | 10.3 | 4 | 8.0 | 63 | 2''' | 81.7 |
| 22 | 16.7 | 2 | 17.5 | 60 | 3''' | 71.0 |
| 23 | 11.5 | 1 | 11.1 | 62 | 4''' | 77.4 |
| 24 | 10.7 | 5 | 8.0 | 63 | 5''' | 81.3 |
| 25 | 10.3 | 2 | 9.7 | 64 | 6''' | 80.0 |
| 26 | 13.0 | 3 | 5.6 | 65 | 7''' | 81.4 |
| 27 | 11.5 | 1 | 8.7 | 66 | 8''' | 79.8 |
| 28 | 13.0 | 1 | 5.3 | 59 | 9''' | 81.7 |
| 29 | 20.0 | 3 | 16.7 | 60 | 10''' | 63.3 |
| 30 | 15.0 | 2 | 8.3 | 61 | 11''' | 76.7 |
| 31 | 5.0 | 1 | 16.7 | 60 | 12''' | 78.3 |

[1] Up to 100 weight percent cresylic acid and high flash naphtha (40 to 60 parts by weight).

TABLE XIII

| Type designation | Chemical composition designation [1] | Wt. percent ester groups [2] | Wt. percent hydroxyl groups [3] | Aldehyde acetal [4] |
|---|---|---|---|---|
| 1 | Formvar 15/95E | 9.5–13 | 5–6 | 85.5–81 |
| 2 | Formvar 7/95E | 9.5–13 | 5–6.5 | 85.5–80.5 |
| 3 | Formvar 5/95E | 9.5–13 | 5–6.5 | |
| 4 | Butvar B–90 | 0.1–1 | 18–20 | 82–79 |
| 5 | 50:50 blend of type 1 and type 2 | 9.5–13 | 5–6.25 | 85.5–80.75 |

[1] Formvar and Butvar are Monsanto Company trademarks.
[2] Ester groups calculated as polyvinyl acetate.
[3] Hydroxyl groups calculated as polyvinyl alcohol.
[4] Aldehyde-acetal calculated as the corresponding polyvinyl acetal.

Example 32

A wire enamel is prepared having the following formulation:

Percent by weight
Formvar 15/95E resin _____ 40
Example 4' phenolic resin varnish _____ 33
Cresylic acid _____ 102
High flash naphtha _____ 173

The preparation procedure involves weighing the respective designated amounts of naphtha and cresylic acid (these materials being as described above) into a mixing tank and adding the phenolic resin varnish of Example 4'. The mixture is agitated to produce thorough mixing. The Formvar 15/95E resin is then added slowly and the mixture stirred until this resin is completely dissolved.

Example 33

An enameled wire is produced by drawing a clean AWG No. 18 copper magnet wire through bath of the enamel of Example 32. The wire is drawn through the bath in a six pass operation with successive dies having diameters of 0.046, 0.047, 0.048, 0.049, 0.050, 0.051 inch and the coated wire is passed through a vertical oven 25 feet high at a speed of about 50 feet per minute, the hottest portion of the oven being at a temperature of about 675° F. The resulting wire is tested and found to have a cut-through temperature of about 175° C. and an abrasion resistance when tested according to the method described below of about 1500–1600 strokes.

Example 34

In this organic liquid are dispersed with mixing the following components:

TABLE XIV

| | Grams | Parts by weight total composition |
|---|---|---|
| Formvar 15/95E [4] | 120 | 4.64 |
| Formvar 7/95E [4] | 180 | 6.96 |
| Varnish of Example 4' | 240 | 5.56 |
| Polyurethane [5] | 60 | 1.16 |
| Melamine-formaldehyde condensates [6] | 10 | 0.23 |

[4] Formvar 15/95E and Formvar 7/95E are as described above in Table XII.
[5] The polyurethane used here is like that described in Example 1 of U.S. Patent 3,077,462. This polyurethane is used in the form of a 50 weight percent solution in 50:50 cresylic acid-Solvesso 100.
[6] The melamine-formaldehyde condensates used here is that available commercially under the trade designation Resimene 882–60 from the Monsanto Company, St. Louis, Missouri and is a 60 weight percent solids solution in xylene.

This enamel composition is particularly well suited for use in wire coating.

Example 35

An enamel wire is produced using the enamel described in Example 34 and the coating procedure and equipment described in Example 33.

The resulting coated wire is tested according to the methods described below and is found to have a cut-through temperature of about 210–220° C., an abrasion resistance of about 1400–1450 strokes, and a 50/50 toluene-methanol extractible level of about 2.3%.

Example 36

Each of the enamel compositions of Examples 1 through 12 is coated onto AWG 18 copper wire using a 25 foot gas-fired two-zone vertical wire tower 25 feet in height. Six passes are employed unless otherwise noted. A total coating thickness of about 1½ mils, e.g., a build on the wire of about 3 mils total coating thickness increase in diameter over the uncoated wire. Each coated layer is cured before a subsequent layer is applied. The oven temperatures at the bottom end and at the top end for the application of each enamel composition are as described in Table XV below as is wire speed. Coating procedure for each successive coating involves passage of the wire being coated through a bath of enamel followed by passage through a wiper die. The wiper dies for each successive coating are graduated so as to be incrementally larger in diameter than the previous uncoated thickness, thereby to control ultimate coating thickness and to produce approximately equal and uniform thickness in individual layers.

Each resulting so-coated wire has a smooth, continuous, hard, electrically insulating coating which is adherent to the wire and is solvent resistant.

TABLE XV.—WIRE COATING EXAMPLES

| Example number | Enamel number | Oven temperature, °F. Top | Oven temperature, °F. Bottom | Speed, f.p.m. | Remarks |
|---|---|---|---|---|---|
| 36 | 1 | 650 | 500 | 50 | |
| 37 | 2 | 650 | 475 | 50 | |
| 38 | 3 | 800 | 525 | 65 | |
| 39 | 4 | 675 | 525 | 40 | |
| 40 | 5 | 825 | 525 | 75 | 8 passes. |
| 41 | 6 | 650 | 475 | 40 | 4 passes. |
| 42 | 7 | 925 | 500 | 85 | |
| 43 | 8 | 625 | 475 | 30 | |
| 44 | 9 | 700 | 500 | 45 | |
| 45 | 10 | 675 | 500 | 40 | |
| 46 | 11 | 650 | 500 | 40 | |
| 47 | 12 | 700 | 500 | 45 | |

Examples 48 and 49

The enamel of Example 32 is knife-coated onto a 20 mil thick aluminum panel and onto a 20 gauge steel panel. Each resulting panel is cured to yield a one mil dry film which is smooth, non-porous, adherent and solvent resistant. When subjected to the test cup procedure described in "Paint and Varnish Production" for September 1965, pp. 71-74, it is observed that the cured enamel surface derived from an enamel of Example 32 displays no discoloration and is homogeneous and continuous.

What is claimed is:

1. A liquid enamel composition adapted for use as a metal coating comprising:
   (A) from about 5 to 75 weight percent of a substituted phenol-formaldehyde resole resin,
   (B) from about 5 to 30 weight percent of a polyvinyl acetal characterized by having:
      (1) a weight average molecular weight of from about 5,000 to 250,000 and
      (2) from about 0.5 to 16 weight percent ester groups calculated as polyvinyl ester, from about 5 to 25 weight percent hydroxyl groups calculated as polyvinyl alcohol, and the balance up to 100 weight percent of any given polyvinyl acetal being substantially aldehyde acetal calculated as the corresponding polyvinyl acetal,
   (C) the balance up to 100 weight percent of any given enamel being substantially an organic liquid, which:
      (1) is substantially inert,
      (2) has a dry point below about 275° C. at atmospheric pressures,
      (3) is a dispersant for both said resin and said polyvinyl acetal,
   (D) said substituted phenol-formaldehyde resole resin being characterized by:
      (1) having a formaldehyde to phenol mol ratio of from about 0.8 to 2.0,
      (2) being produced by reacting under aqueous liquid phase conditions formaldehyde and a substituted phenol mixture in the presence of a basic catalyst,
      (3) being substantially insoluble in water but having a viscosity in methanol solution at 60 weight percent solids concentration of not greater than about 5000 centipoises, and
      (4) having a free formaldehyde content which is less than about 5 weight percent,
   (E) said substituted phenol mixture having been prepared by reacting phenol under Friedel-Crafts conditions with from about 35 to 80 parts by weight for each 100 parts by weight of said phenol of a mixture of carbocyclic compounds,
   (F) said mixture of carbocyclic compounds comprising (on a 100 weight percent basis when in a form substantially free of other materials):
      (1) from about 50 to 99 weight percent of compounds each molecule of which has:
         (a) the dicyclopentadiene nucleus,
         (b) from 10 through 13 carbon atoms,
         (c) as nuclear substituents from 0 through 3 methyl groups, and
      (2) from about 1 to 50 weight percent of compounds each molecule of which is a codimer of cyclopentadiene with at least one acyclic conjugated alkadiene having from 4 through 6 carbon atoms per molecule.

2. The enamel composition of claim 1 wherein said mixture of carbocyclic compounds comprises (same basis):
   (A) from about 70 to 90 weight percent of dicyclopentadiene,
   (B) from about 10 to 30 weight percent of compounds each molecule of which is a codimer of cyclopentadiene with at least one acyclic conjugated alkadiene having from 4 through 6 carbon atoms per molecule, and
   (C) from about 2 to 15 weight percent of compounds each molecule of which is a cyclic and/or an acyclic conjugated alkadiene having 5 or 6 carbon atoms per molecule.

3. The enamel composition of claim 1 wherein said mixture of carbocyclic compounds comprises (same basis):
   (A) from about 1.5 to 10 weight percent of compounds each molecule of which has:
      (1) the indene nucleus,
      (2) from 9 through 13 carbon atoms,
      (3) as nuclear substituents from 0 through 4 methyl groups,
   (B) from about 50 to 70 weight percent of compounds each molecule of which has:
      (1) the dicyclopentadiene nucleus,
      (2) from about 10 through 13 carbon atoms,
      (3) as nuclear substituents from 0 through 3 methyl groups,
   (C) from about 4 to 10 weight percent of compounds each molecule of which is a codimer of cyclopentadiene with at least one acyclic conjugated alkadiene having from 4 through 6 carbon atoms per molecule, and
   (D) from about 4 to 30 weight percent of compounds each molecule of which has:
      (1) a phenyl group substituted by a vinylidene group,
      (2) from 8 through 13 carbon atoms,
      (3) as substituents from 0 through 3 groups selected from the class consisting of methyl and ethyl.

4. The enamel composition of claim 1 wherein said mixture of carbocyclic compounds comprises (same basis):
   (A) from about 92 to 97 weight percent of dicyclopentadiene,
   (B) from about 1 to 5 weight percent of compounds each molecule of which is a codimer of cyclopentadiene with at least one acyclic conjugated alkadiene having from 4 through 6 carbon atoms per molecule, and
   (C) from about 1 to 4 weight percent of compounds each molecule of which is a codimer of cyclopentadiene with a methylcyclopentadiene, provided that the sum of (A) and (C) in any given such cyclopentadiene dimer mixture is always at least about 95 weight percent.

References Cited

UNITED STATES PATENTS

| | | | |
|---|---|---|---|
| 2,843,566 | 7/1958 | Christenson et al. | 260—844 |
| 2,907,751 | 10/1959 | Christenson et al. | 260—53 |
| 2,964,491 | 10/1960 | Rylander et al. | 260—844 |
| 3,075,832 | 1/1963 | Ecke et al. | 260—53 |
| 3,104,236 | 9/1963 | Lavin et al. | 260—844 |

JOHN C. BLEUTGE, Primary Examiner

U.S. Cl. X.R.

117—62.2, 128.4, 132, 218, 232; 260—29.3, 32.8, 33.2, 33.4, 33.6, 53, 839, 841